(12) United States Patent
Marumo (10) Patent No.: US 11,216,651 B2
(45) Date of Patent: Jan. 4, 2022

(54) INFORMATION PROCESSING DEVICE AND REPORTING METHOD

(71) Applicant: TOSHIBA TEC KABUSHIKI KAISHA, Tokyo (JP)

(72) Inventor: Nobuyuki Marumo, Izu Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/005,183

(22) Filed: Aug. 27, 2020

(65) Prior Publication Data

US 2021/0089757 A1 Mar. 25, 2021

(30) Foreign Application Priority Data

Sep. 24, 2019 (JP) .............................. JP2019-173481

(51) Int. Cl.
*G06K 9/00* (2006.01)

(52) U.S. Cl.
CPC ..... *G06K 9/00288* (2013.01); *G06K 9/00255* (2013.01); *G06K 9/00261* (2013.01); *G06K 9/00342* (2013.01)

(58) Field of Classification Search
CPC .......... G06K 9/00288; G06K 9/00342; G06K 9/00261; G06K 9/00255; G06K 9/00771; G06K 9/00335; G06K 2209/17; G06K 9/00664; G06K 9/626; G06K 9/6282; G06K 19/067; G06K 9/00315; G06K 9/52; G06K 9/60; G06K 9/6267; G06K 9/00369; G06K 9/00892; G06Q 30/06; G06Q 30/0281; G06Q 30/01; G06Q 30/0283; G06Q 20/02; G06Q 20/023; G06Q 10/06311; G06Q 10/087; G06Q 10/10; G06Q 20/20; G06Q 20/40145; G06Q 30/00; G06Q 30/0207; G06Q 30/0222; G06Q 30/0226;
(Continued)

(56) References Cited

U.S. PATENT DOCUMENTS

2016/0379225 A1* 12/2016 Rider ................. G06K 9/00248
382/116
2019/0259259 A1* 8/2019 Mullins ............ G08B 13/19682
(Continued)

FOREIGN PATENT DOCUMENTS

JP 2019032778 A 2/2019

*Primary Examiner* — Nimesh Patel
(74) *Attorney, Agent, or Firm* — Kim & Stewart LLP (57) ABSTRACT

An information processing device includes a communication interface to receive a facial image of a store customer, position information for the customer indicating a position of the customer in the store, and item registration information indicating items registered by the customer using a customer terminal. A processor compares the facial image to a facial image pattern associated with potential customer states, compares the position information to a movement pattern associated with potential customer states, and compares the item registration information received via the communication interface to pre-established item registration values associated with potential customer states. Based on the comparisons, the processor identifies whether a present state of the customer is considered to be one of the potential customer states. A report is generated if the present state of the customer is considered one of the potential customer states.

17 Claims, 8 Drawing Sheets

(58) Field of Classification Search
CPC ........... G06Q 30/0269; G06Q 30/0601; G06Q 30/0201; G06Q 30/02; G06Q 10/08; G06Q 20/12; G06Q 10/06393; G06Q 10/0833; G06Q 20/18; G06Q 30/0255; G06Q 20/40; G06Q 20/123; G06Q 20/4014; G06Q 10/0838; G06Q 10/0875; G06Q 30/0237; G06Q 30/0238; G06T 2207/10048; G06T 2207/20081; G06T 2207/20084; G06T 2207/30128; G06T 7/0004; G06T 7/11; G06T 7/50; G06T 7/60; G06T 7/70; G06T 7/90; G06T 11/206; G06F 16/24573; G06F 16/26; G06F 16/285; G06F 21/31; G06F 21/83; G06F 2221/031; G06F 2221/2111; A47F 9/047; A47F 9/046; A47F 9/048; A47F 9/00; G07G 1/0054; G07G 3/00; G07G 1/0045; G07G 1/0036; G07G 3/006; G07G 1/0018; G07G 1/0063; G07G 3/003; G07G 5/00; G07F 9/026; G07F 17/16; G07F 17/3223; G07F 17/3239; G07F 17/3255; G07F 17/329; G07F 19/20; G07F 9/001; G06N 5/022; G06N 3/004

See application file for complete search history.

(56) References Cited

U.S. PATENT DOCUMENTS

2020/0005364 A1* 1/2020 Aznaurashvili .... G06Q 30/0281
2020/0193789 A1* 6/2020 Budano .............. G08B 13/2462

\* cited by examiner

| STATE CODE | NAME | FACE IMAGE PATTERN | VOICE PATTERN | CUSTOMER MOVING PATTERN | COMMODITY REGISTRATION STATE PATTERN | ... |
|---|---|---|---|---|---|---|
| 001 | COMMODITY SEARCH | IMAGE A | VOICE A | MOVING PATTERN A | STATE A | ... |
| 002 | SHOPLIFTING | IMAGE B | VOICE B | MOVING PATTERN B | STATE B | ... |
| 003 | ILL HEALTH | IMAGE C | VOICE C | MOVING PATTERN C | STATE C | ... |
| ⋮ | ⋮ | ⋮ | ⋮ | ⋮ | ⋮ | ⋮ |

INFORMATION PROCESSING DEVICE AND REPORTING METHOD

CROSS-REFERENCE TO RELATED APPLICATION

This application is based upon and claims the benefit of priority from Japanese Patent Application No. 2019-173481, filed Sep. 24, 2019, the entire contents of which are incorporated herein by reference.

FIELD

Embodiments described herein relate generally to an information processing device and a reporting method with uses in monitoring customers in a retail store.

BACKGROUND

In a store such as a supermarket, a store clerk is generally requested to speak to a customer and perform appropriate service if the customer is thought to be searching for an item for sale, ill, or suspicious, such as a shoplifter or the like.

However, the store clerk has various other tasks to accomplish, such as arrangement or stocking of products on shelves, besides specifically attending to a customer. Accordingly, it can be difficult or complicated for the store clerk to perform the customer attendance tasks appropriately every time the need arises. Therefore, there is a demand for a technique for reducing a burden on the store clerk with regard to customer attendance tasks and the like.

DETAILED DESCRIPTION

In general, according to an embodiment, an information processing device for a retail store includes a communication interface configured to receive a face image of a customer of a store, position information indicating a position of the customer in the store, and item registration information indicating items registered by the customer using a customer terminal. A processor of the information processing device is configured to compare the face image received via the communication interface to a face image pattern for potential customer states, compare the position information received via the communication interface to a movement pattern for potential customer states, compare the item registration information received via the communication interface to pre-established item registration values for potential customer states, and determine, based on these comparisons, whether a present state of the customer is one of the potential customer states. The processor generates a report if the present state of the customer is determined to be one of the potential customer states.

Certain example embodiments are explained with reference to the accompanying drawings. The present disclosure is not limited to these examples. In an embodiment explained below an information processing device, a program, and a reporting method are described. The information processing device, the program, and the reporting method according to these examples relate to a management server used for managing customer terminals in a store such as a supermarket.

Figure 1:
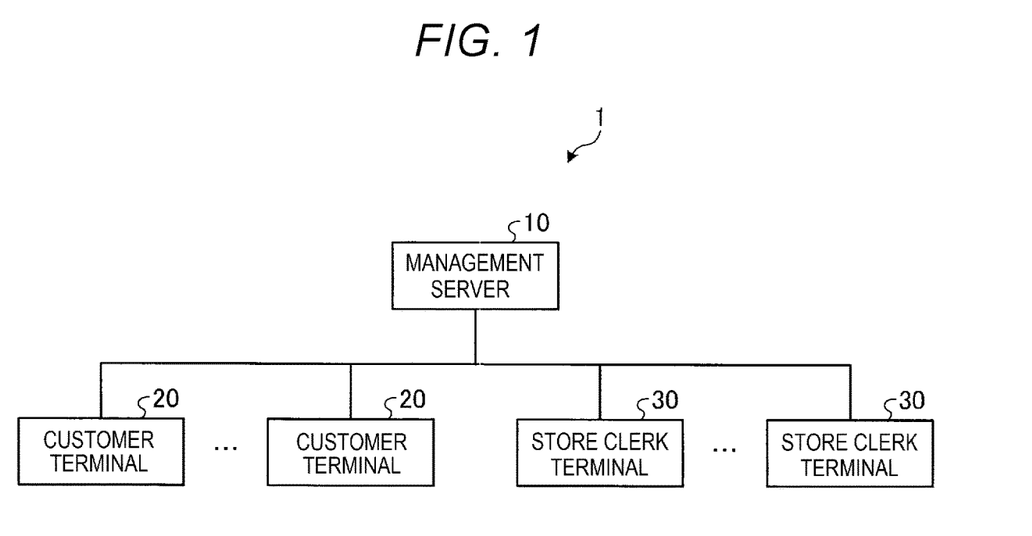
FIG. 1 depicts a customer monitoring system according to an embodiment.

FIG. 1 is an explanatory diagram illustrating an example of a customer monitoring system 1 according to an embodiment. The customer monitoring system 1 observes a state of a customer and executes reporting corresponding to the observed state of the customer. The customer monitoring system 1 includes a management server 10, a plurality of customer terminals 20, and a plurality of store clerk terminals 30. The management server 10, the plurality of customer terminals 20, and the plurality of store clerk terminals 30 are communicably connected via a network.

The management server 10 is an information processing device that manages the customer monitoring system 1. For example, the management server 10 is a server device or a personal computer. The management server 10 is not necessarily limited to one information processing device and may be configured as a plurality of server devices or the like.

The management server 10 receives monitoring information, which is an observation result obtained by observing actions of a customer via a customer terminal 20. The management server 10 determines a state of the customer based on the monitoring information. The management server 10 generates reports according to a determination of the state of the customer. For example, the management server 10 transmits information corresponding to the state of the customer to cause a customer terminal 20 or a store clerk terminal 30 to output an image or sound.

The customer terminal 20 is a terminal used by a customer. For example, the customer terminal 20 is a portable terminal such as a smartphone or a tablet terminal. The customer terminal 20 may be a terminal attached to a cart POS 21.

Figure 2:
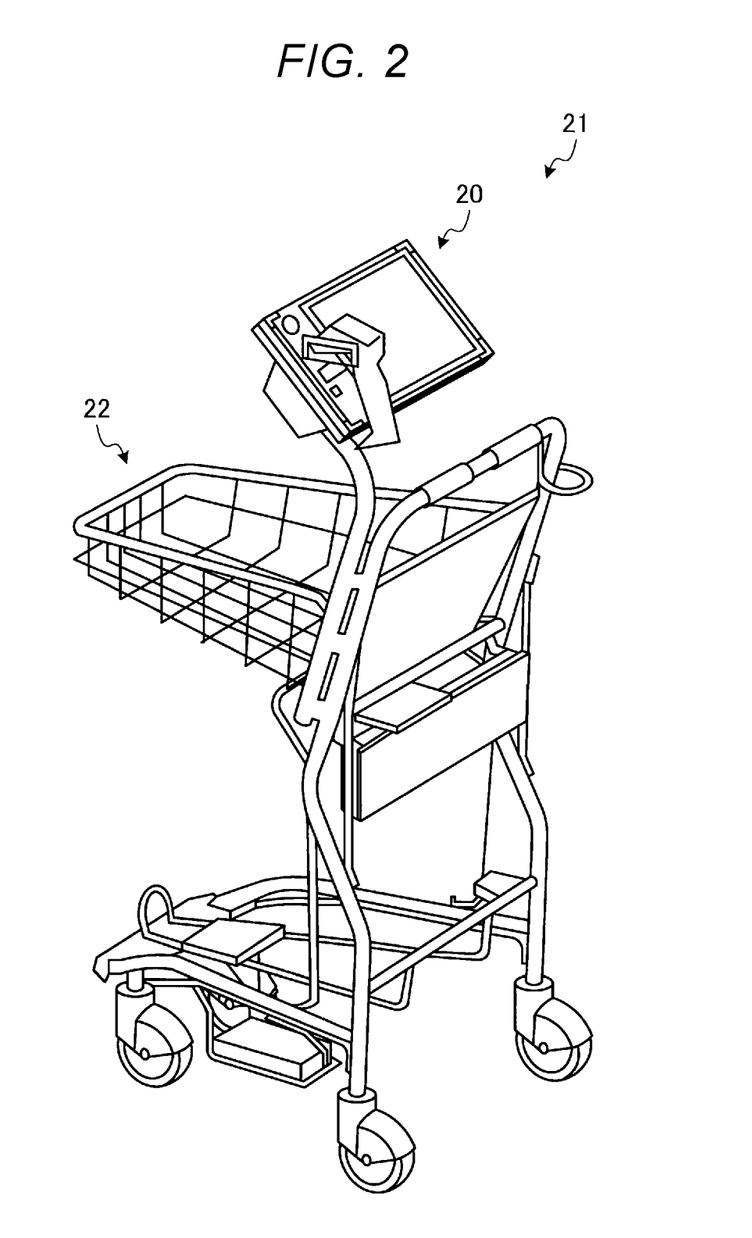
FIG. 2 is a perspective view illustrating an example of an exterior of a cart-based point-of sale (POS) terminal.

FIG. 2 is a perspective view illustrating an example of an exterior of the cart POS 21. For the cart POS 21, a customer terminal 20 is attached to a shopping cart 22. The customer terminal 20 reads a code symbol such as a barcode attached to a sales target commodity (item to be purchased) to register the sales target commodity in sales transaction. Further, the customer terminal 20 can execute a payment process, which is payment for the registered item(s). In the case of the cart POS 21 to which the customer terminal 20 is attached, the customer can collect a commodity and perform commodity registration by causing the customer terminal 20 to read a code symbol attached to the commodity. In this embodiment, the customer terminal 20 is capable of executing the payment process. However, the customer terminal 20 does not have to be able to execute the payment process.

The customer terminal 20 observes the customer. The customer terminal 20 transmits monitoring information obtained by observing the customer to the management server 10. The monitoring information is, for example, a face image obtained by imaging the face of the customer, voice information obtained by recording voice of the customer, and position information indicating a position where the customer is located in a store.

In the store where the customer monitoring system 1 is provided, a plurality of beacon terminals, which transmit beacons using BLE (Bluetooth® Low Energy) or the like, are set around the store at various points. The customer terminal 20 can measure the position of the customer terminal 20 by receiving signals form the beacon terminals. In the following explanation in this embodiment, as one example, the customer terminal 20 measures the position of the customer terminal 20 using BLE beacons. However, in other embodiments, the customer terminal 20 may receive signals transmitted using a communication standard other than the BLE. For example, the customer terminal 20 may measure a position of the customer terminal 20 with a GPS (Global Positioning System) method or other methods.

The customer terminal 20 outputs reports if information is received from the management server 10. For example, if the management server 10 determines that the customer is presently searching for a commodity, the customer terminal 20 outputs information received from the management server 10 to report about presence or absence of the commodity that the customer is searching for. On the other hand, if the customer specifically inputs an identification of the commodity that the customer is searching for, the customer terminal 20 can display a screen or the like indicating a position in the store where the commodity is located.

The store clerk terminal 30 is a terminal used by a store clerk. For example, the store clerk terminal 30 is a portable terminal such as a smartphone or a tablet terminal. For example, the store clerk terminal 30 outputs reports to the store clerk that it has been determined, based on information transmitted from the management server 10, that an ill customer is present or that a customer highly likely to be a suspicious person who might be a shoplifter or the like is present.

The customer monitoring system 1 may include devices other than the devices illustrated in FIG. 1. For example, the customer monitoring system 1 may include a monitoring camera, a sensor, or the like set in the store. For example, the monitoring camera captures an image of the customer to collect monitoring information of the customer. The monitoring camera transmits the image of the customer to the management server 10 as monitoring information.

Figure 3:
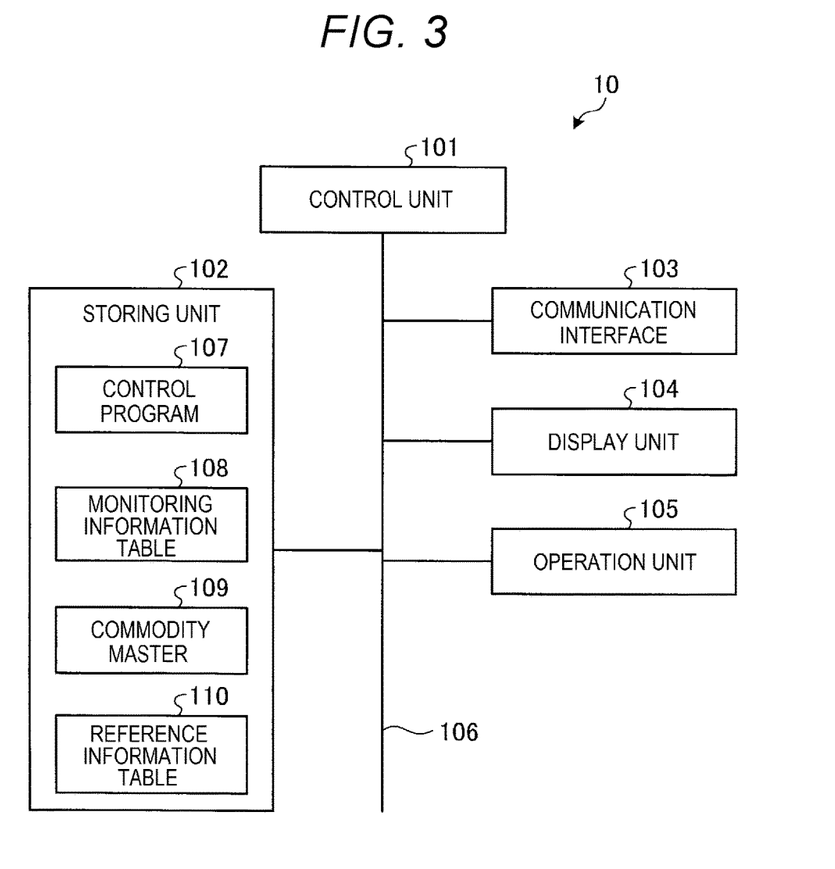
FIG. 3 is a block diagram illustrating aspects of an example of a management server.

FIG. 3 is a block diagram illustrating an example of a hardware configuration of the management server 10. The management server 10 includes a control unit 101, a storing unit 102, a communication interface 103, a display unit 104, and an operation unit 105. These units are connected to one another via a system bus 106.

The control unit 101 is a computer that controls the operation of the management server 10 and realizes the various functions of the management server 10. The control unit 101 includes a CPU (Central Processing Unit), a ROM (Read Only Memory), and a RAM (Random Access Memory). The CPU controls the operations of the management server 10. The ROM is a storage medium that stores various programs and data. The RAM is a storage medium that temporarily stores various programs and various data. The CPU executes programs stored in the ROM, the storing unit 102, or the like using the RAM as a work area (a work region).

The storing unit 102 is a storage device such as an HDD (Hard Disk Drive) or an SSD (Solid State Drive). The storing unit 102 stores a control program 107, a monitoring information table 108, a commodity master 109, and a reference information table 110.

The control program 107 is an operating system or a program for providing the functions of the management server 10.

The monitoring information table 108 stores information about the state of the customer transmitted from the customer terminal 20. The monitoring information table 108 stores a customer code, monitoring information, and commodity registration information in association with one another. The customer code is identification information capable of identifying the customer. The monitoring information is information obtained by observing the state of the customer. For example, the monitoring information is a face image of the customer, voice information of the customer, position information of the customer, and the like. The commodity registration information is information indicating the state of commodity registration by the customer. In other words, the commodity registration information indicates which commodities have been selected and registered by the customer for purchase. For example, the commodity registration information is information indicating the total number of registered commodities. The commodity registration information is not limited to the number of commodities and may include attributes of the registered commodities (e.g., prices) or may be other information.

Figure 4:
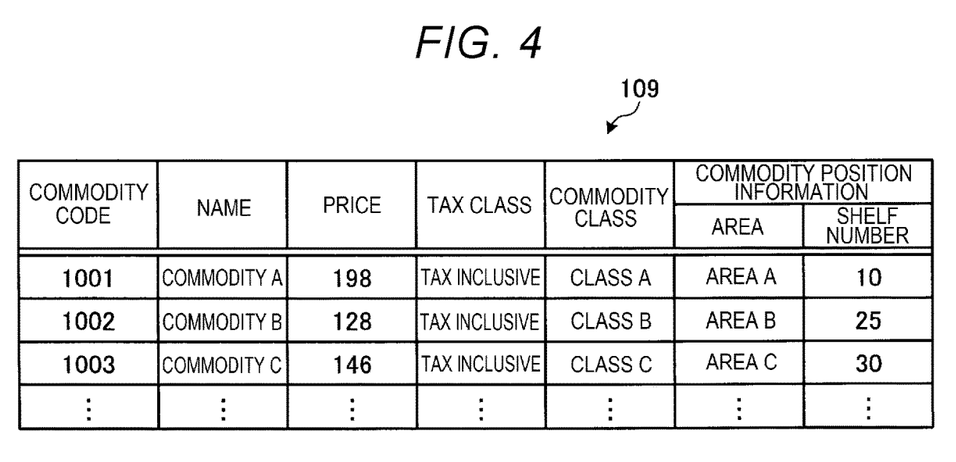
FIG. 4 is a diagram illustrating an example of a data configuration of a commodity master.

The commodity master 109 stores various kinds of information concerning commodities for sale at the store. FIG. 4 is a diagram illustrating an example of a data configuration of the commodity master 109. The commodity master 109 stores a commodity code, a product name, a price, a tax class, a commodity class, and commodity position information in association with one another. The commodity code is identification information capable of identifying a commodity. The product name is a name, such as a common name, of the commodity. The price is the unit price of the commodity. The tax class indicates a class for the commodity with respect to a consumption tax, sales tax, or the like. The commodity class indicates a classification to which the commodity belongs. The commodity position information is information indicating a position where the commodity is on a selling floor of the store. The commodity position information includes information such as an area ID and a shelf number. The area information indicates a particular area/region in the store where the commodity is disposed. The shelf number is information indicating a particular shelf on which the commodity is normally disposed.

Figure 5:
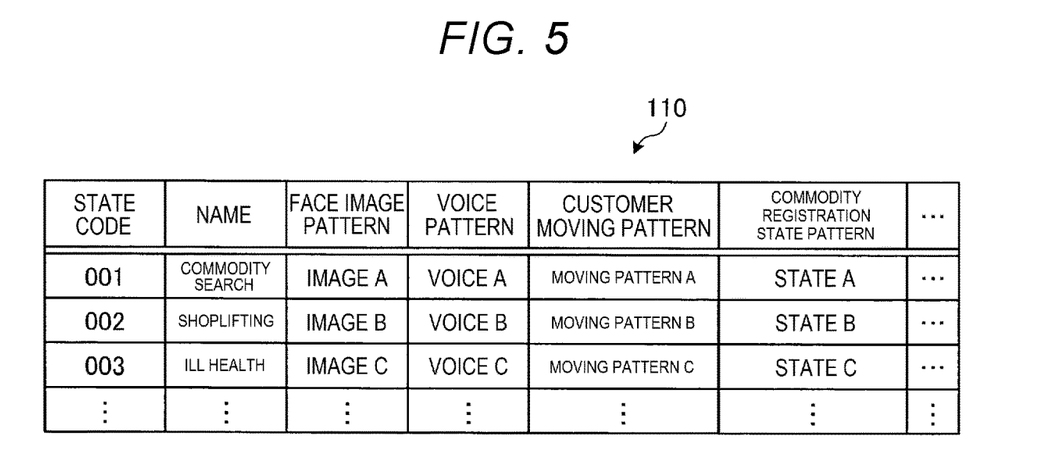
FIG. 5 is a diagram illustrating an example of a data configuration of a reference information table.

The reference information table 110 (FIG. 5) stores information to be referenced in determination of the state of a customer. FIG. 5 is a diagram illustrating an example of a data configuration of the reference information table 110. The reference information table 110 stores a state code, a name, a face image pattern, a voice pattern, a customer moving pattern, and a commodity registration state pattern in association with one another. The state code is identification information capable of identifying one of a plurality of potential states of a customer. The name field provides a name corresponding to the particular state of the customer. The face image pattern provides information indicating characteristics of a face image of a person in a specific state. In other words, the face image pattern is a face image pattern for comparison to a present face image of a customer for potentially identifying a customer state. The voice pattern is information indicating characteristics of sound or speech typically uttered by a person in the specific state. The customer moving pattern is information indicating characteristics of a movement about the store of a person in the specific state. In other words, the customer moving pattern is a moving pattern for comparison purposes to observed movements of the customer. The commodity registration state pattern is information indicating typical characteristics of a collection state of commodities by a person in the specific state. In other words, the commodity registration state pattern is a state pattern for comparison purposes. For example, the commodity registration state pattern is the typical or expected number of commodities registered when the customer is in the relevant state.

In the reference information table 110 depicted in FIG. 5, the sate names "commodity search," "shoplifting," and "ill health" are registered as the potential states of a customer. The commodity search state is a state in which the customer appears to be searching for a specific commodity. The shoplifting state is a state in which the customer appears about to take away a commodity without paying. In this embodiment, shoplifting is explained as an example of a suspicious person. However, a suspicious person need not be a shoplifter in all examples. In this case, an additional potential state might be registered in the reference information table 110. The ill health state is a state in which a physical condition of the customer is considered to be bad.

For example, in the case of the commodity search, visual lines of the customer being directed to various parts of a shelf can be registered in the face image pattern of the reference information table 110. A phrase or word uttered by the customer while searching for a commodity such as "where is it?" is registered in the voice pattern information. For example, rapid movement of the user around in a predetermined region is registered in the customer moving pattern. A threshold indicating the number of registered commodities is registered in the commodity registration state pattern.

For example, in the case of the shoplifting, visual lines of the customer being directed to various parts of an aisle or passage are registered in the face image pattern of the reference information table 110. Not uttering a word is registered in the voice pattern information. For example, a customer moving around in a predetermined region is registered in the customer moving pattern. A threshold indicating the number of registered commodities is registered in the commodity registration state pattern.

For example, in the case of the ill health, the customer looking pale is registered in the face image pattern of the reference information table 110. Not uttering a word is registered in the voice pattern information. The customer not moving within a predetermined period is registered in the customer moving pattern. A threshold indicating the number of registered commodities is registered in the commodity registration state pattern.

The communication interface 103 is for communicating with other devices via a network. For example, the communication interface 103 is for communicating with the customer terminal 20 and the store clerk terminal 30.

The display unit 104 is a display device such as a liquid crystal display. The operation unit 105 is an input device such as a keyboard or a mouse.

Figure 6:
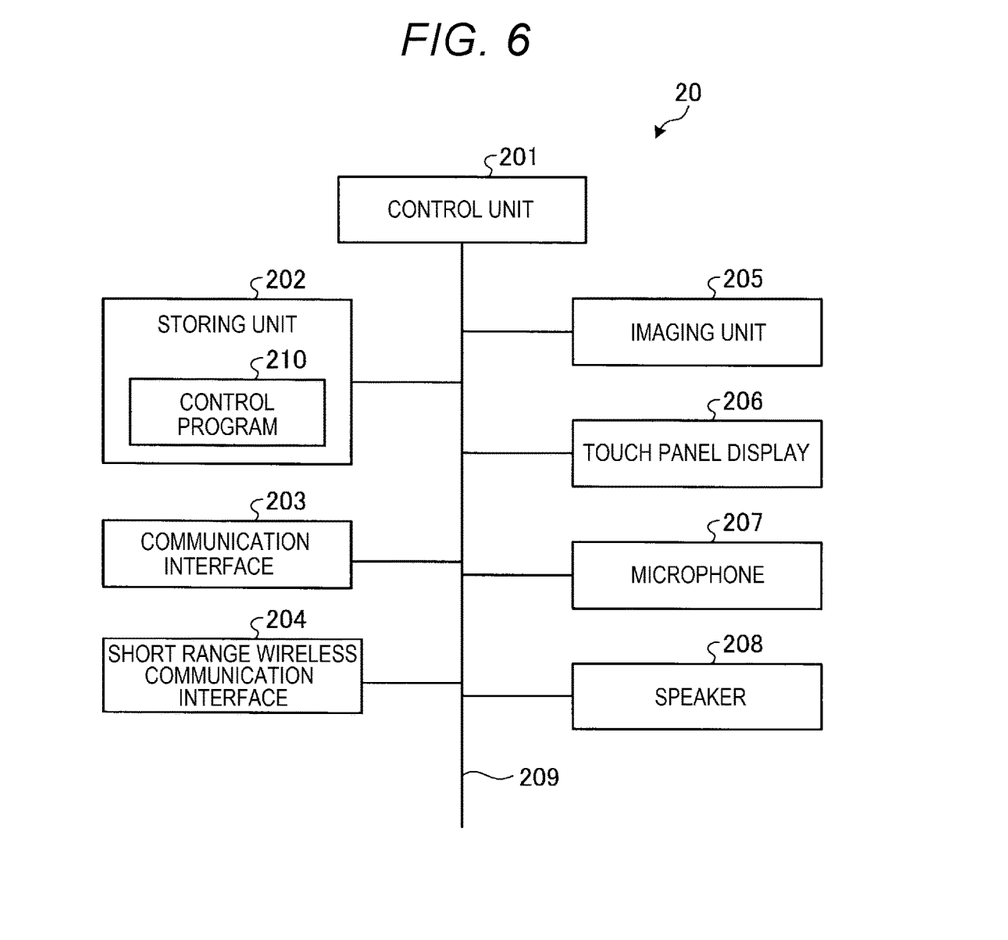
FIG. 6 is a block diagram illustrating an example of a hardware configuration of a customer terminal.

FIG. 6 is a block diagram illustrating an example of a hardware configuration of the customer terminal 20. The customer terminal 20 includes a control unit 201, a storing unit 202, a communication interface 203, a short range wireless communication interface 204, an imaging unit 205, a touch panel display 206, a microphone 207, and a speaker 208. These units are connected to one another via a system bus 209.

The control unit 201 is a computer that controls the operations of the customer terminal 20 and realizes various functions of the customer terminal 20. The control unit 201 includes a CPU, a ROM, and a RAM. The CPU controls the operation of the customer terminal 20. The ROM is a storage medium that stores various programs and data. The RAM is a storage medium that temporarily stores various programs and various data. The CPU executes the programs stored in the ROM, the storing unit 202, or the like using the RAM as a work area (a work region).

The storing unit 202 is a storage device such as a flash memory. The storing unit 202 stores a control program 210. The control program 210 is an operating system or a program for realizing the functions of the customer terminal 20.

The communication interface 203 is an interface for communicating with other devices via a network. For example, the communication interface 203 is an interface for communicating with the management server 10.

The short range wireless communication interface 204 is an interface for executing short range wireless communication. For example, the short range wireless communication interface 204 receives beacon signals from the beacon terminals via short range wireless communication such as the BLE.

The imaging unit 205 is an image sensor including an imaging element such as a CCD (Charge Coupled Device) or a CMOS (Complementary Metal-Oxide-Semiconductor). The imaging unit 205 is directed towards an operator of the customer terminal 20. Accordingly, the imaging unit 205 can capture a face image of the customer while the customer is operating the customer terminal 20.

The touch panel display 206 is a display device including a sensor that detects a selected (touched) part on a screen.

The microphone 207 is a sound collecting device that collects sounds uttered by the operator. Consequently, the microphone 207 collects sounds (e.g., spoken words) uttered by the customer while operating the customer terminal 20.

The speaker 208 is a device that emits sound.

Figure 7:
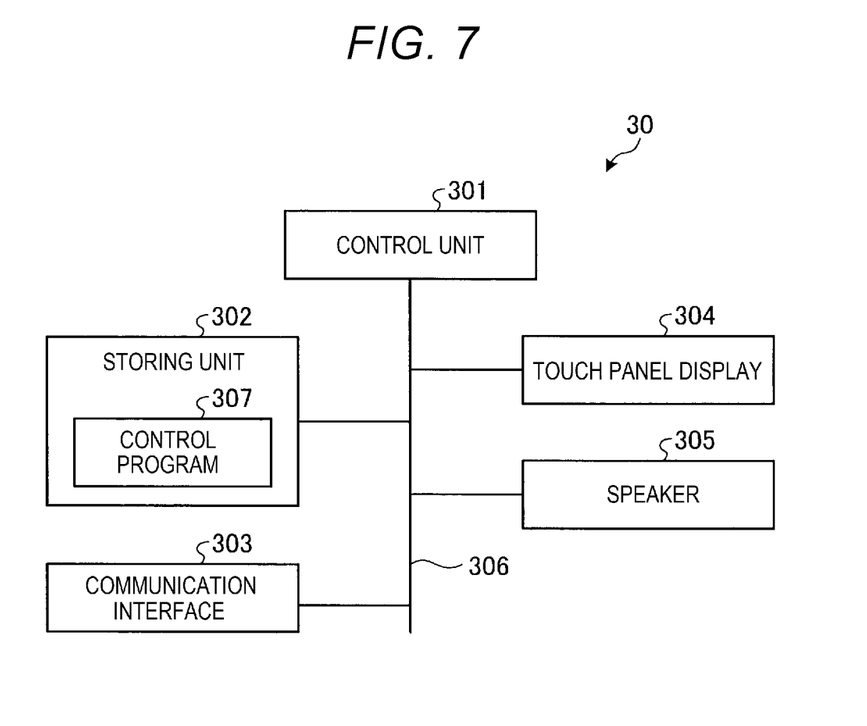
FIG. 7 is a block diagram illustrating aspects of an example of a store clerk terminal.

FIG. 7 is a block diagram illustrating an example of a hardware configuration of the store clerk terminal 30. The store clerk terminal 30 includes a control unit 301, a storing unit 302, a communication interface 303, a touch panel display 304, and a speaker 305. These units are connected to one another via a system bus 306.

The control unit 301 is a computer that controls the operations of the store clerk terminal 30 and realizes various functions of the store clerk terminal 30. The control unit 301 includes a CPU, a ROM, and a RAM. The CPU collectively controls the operation of the store clerk terminal 30. The ROM is a storage medium that stores various programs and data. The RAM is a storage medium that temporarily stores various programs and various data. The CPU executes the programs stored in the ROM, the storing unit 302, or the like using the RAM as a work area (a work region).

The storing unit 302 is a storage device such as a flash memory. The storing unit 302 stores a control program 307. The control program 307 is an operating system or a program for realizing the functions of the store clerk terminal 30.

The communication interface 303 is an interface for communicating with other devices via a network. For example, the communication interface 303 is an interface for communicating with the management server 10.

The touch panel display 304 is a display device including a sensor that detects a selected (touched) part on a screen.

The speaker 305 is a device that emits sound.

Figure 8:
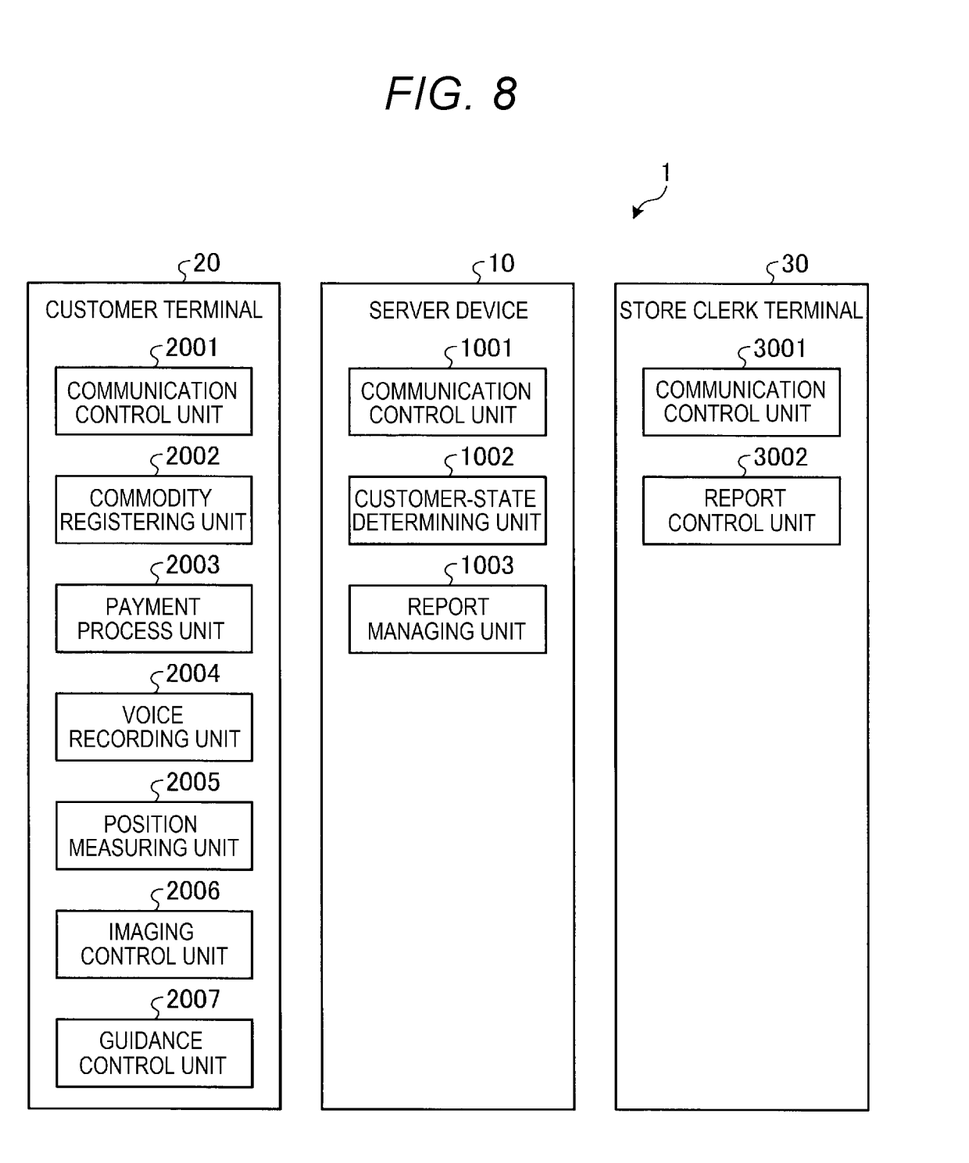
FIG. 8 is a block diagram illustrating functional aspects of devices of a customer monitoring system according to an embodiment.

FIG. 8 is a block diagram illustrating characteristic functional aspects of the devices of the customer monitoring system 1.

The control unit 201 loads, in the RAM, the control program 210 stored in the storing unit 202 and operates according to the control program 210 to generate the depicted functional units (see FIG. 8) in the RAM. Specifically, the control unit 201 of the customer terminal 20 includes, as the functional units, a communication control unit 2001, a commodity registering unit 2002, a payment process unit 2003, a voice recording unit 2004, a position measuring unit 2005, an imaging control unit 2006, and a guidance control unit 2007.

The communication control unit 2001 controls the communication interface 203 to execute communication with the management server 10.

The commodity registering unit 2002 executes a commodity registration process for registering a sales target commodity. For example, if the imaging unit 205 images a code symbol, the commodity registering unit 2002 decodes the code symbol included in a captured image to acquire a commodity code. The commodity registering unit 2002 registers a commodity as specified by the acquired commodity code. The commodity registering unit 2002 causes the communication control unit 2001 to transmit commodity registration information indicating a collection state of commodities to the management server 10. The commodity registering unit 2002 is not limited to the reading of the commodity code and may register a commodity as specified by an operation input (e.g., a manual input of a commodity identification or the like).

The payment process unit 2003 controls a payment process for the commodity registered by the commodity registering unit 2002. For example, the payment process unit 2003 calculates a total price of commodities registered by the commodity registering unit 2002. The payment process unit 2003 executes a payment process using a credit card, for example.

The voice recording unit 2004 causes the storing unit 202 or the like to store a voice of the operator collected by the microphone 207. The voice recording unit 2004 causes the communication control unit 2001 to transmit voice information, which is the voice of the operator stored in the storing unit 202 or the like, as monitoring information.

The position measuring unit 2005 measures the position of the customer terminal 20 and generates position information indicating where the customer is located in the store. More specifically, the position measuring unit 2005 measures the position of the customer terminal 20 based on a beacon signal received by the short range wireless communication interface 204. However, the position measuring unit 2005 may measure the position of the customer terminal 20 with any position measuring or detecting method. For example, the position measuring unit 2005 measures the position of the customer terminal 20 by comparing a beacon ID included in a beacon signal transmitted by a beacon terminal closest in position to the customer terminal 20. The customer terminal 20 may compare radio wave intensity of beacon signals received from multiple beacon terminals at known locations in the store to measure the position of the customer terminal 20 with triangulation or the like. The customer terminal 20 may determine a position of the customer terminal 20 with methods other than these methods. The position measuring unit 2005 causes the communication control unit 2001 to transmit, as monitoring information, the position information indicating the position where the customer is located in the store.

The imaging control unit 2006 images the face of the customer operating the customer terminal 20. The imaging control unit 2006 causes the communication control unit 2001 to transmit, as monitoring information, image information obtained by imaging the face of the customer.

The guidance control unit 2007 controls a guidance process for guiding the customer to a commodity that the customer is searching for. More specifically, the management server 10 determines whether the customer operating the customer terminal is searching for a commodity based on the monitoring information transmitted by the customer terminal 20. If determined that the customer operating the customer terminal 20 is searching for a commodity, the management server 10 transmits a guidance confirmation request.

If the communication control unit 2001 receives the guidance confirmation request, the guidance control unit 2007 inquires the customer whether the customer is searching for a commodity. For example, the guidance control unit 2007 inquires the customer by causing the speaker 208 to output a voice message for inquiring whether the customer is searching for a commodity or causing the touch panel display 206 to output an image (e.g., a text inquiry) for inquiring whether the customer is searching for a commodity.

If the customer is searching for a commodity, the guidance control unit 2007 requests the customer to input information indicating the particular commodity that the customer is searching for. For example, the guidance control unit 2007 requests an input of a commodity code, a commodity name, or the like as commodity information indicating the particular commodity that the customer is searching for. If information indicating the commodity that the customer is searching for is input, the guidance control unit 2007 causes the communication control unit 2001 to transmit the input commodity information.

If the communication control unit 2001 receives commodity guidance information as a response to the commodity information, the guidance control unit 2007 informs the customer of a position or status of the commodity. For example, if the commodity is out of stock, the commodity guidance information indicates that the commodity is out of stock. On the other hand, if the is in stock, the commodity guidance information includes commodity position information. The commodity position information includes an area where the commodity is disposed and a shelf number for a shelf on which the commodity is disposed.

Therefore, if the commodity guidance information indicates that the commodity is out of stock, the guidance control unit 2007 informs that the commodity specified by the input commodity information is out of stock. In other words, the guidance control unit 2007 causes the speaker 208 to output sound, such as a voice message, indicating that the commodity is out of stock. The guidance control unit 2007 also causes the touch panel display 206 to display a message that the commodity is out of stock.

On the other hand, if the commodity guidance information includes an area where the commodity is located and a shelf number, the guidance control unit 2007 outputs information for guiding the customer to where the commodity is located. For example, the guidance control unit 2007 causes the speaker 208 to output a voice message indicating the area and the shelf number. The guidance control unit 2007 also causes the touch panel display 206 to display a screen showing the area and the shelf number. Alternatively, the guidance control unit 2007 causes the touch panel display 206 to display, on a map of the store, a position specified by the area and the shelf number. Alternatively, the guidance control unit 2007 executes a navigation process for guiding the customer from a present position to the position specified by the area and the shelf number. In this way, the guidance control unit 2007 executes the guidance process.

The control unit 101 of the management server 10 loads, in the RAM, the control program 107 stored in the storing unit 102 and operates according to the control program 107 to generate the depicted functional units in the RAM. Specifically, the control unit 101 of the management server 10 includes, as the functional units, a communication control unit 1001, a customer-state determining unit 1002, and a report managing unit 1003.

The communication control unit 1001 is an example of an input unit. The communication control unit 1001 controls the communication interface 103 to execute communication between the customer terminal 20 and the store clerk terminal 30. For example, the communication control unit 1001 receives a face image of the customer, position information indicating a position where the customer is in the store, and commodity registration information indicating a collection state of commodities by the customer. The communication control unit 1001 may receive the face image, the position information, and the commodity registration image collectively as one transmission or may receive the face image, the position information, and the commodity registration information individually.

The customer-state determining unit 1002 compares the face image received by the communication control unit 1001, a moving pattern of the customer indicated by position information gathered over time, and the commodity registration information with the reference information table 110 to determine whether the customer is in a specific state. More specifically, if the communication control unit 1001 receives monitoring information, the customer-state determining unit 1002 causes the monitoring information table 108 to store the monitoring information in association with a customer terminal code indicating the customer terminal 20 as a transmission source.

The customer-state determining unit 1002 refers to the reference information table 110 for identifying a state of the customer indicated by the monitoring information for each of customer terminal codes in the monitoring information table 108. For example, the customer-state determining unit 1002 determines which potential state, the commodity search, the shoplifting, or the ill health, the present state of the customer corresponds. The customer-state determining unit 1002 may determine the present state of the customer according to not only the face image, the position information, and the commodity registration information but also voice information. Further, the customer-state determining unit 1002 may determine the state of the customer according to additional information beyond these kinds of information.

In the case of the commodity search state, the customer-state determining unit 1002 determines whether commodity search state conditions are satisfied. More specifically, the customer-state determining unit 1002 determines, based on the face image of the monitoring information in the monitoring information table 108, whether visual lines of the customer are directed to various parts of a shelf. The customer-state determining unit 1002 determines, based on the position information of the monitoring information in the monitoring information table 108, whether the customer moves around in a predetermined region. The customer-state determining unit 1002 determines, based on the commodity registration information in the monitoring information table 108, whether the number of registered commodities is equal to or larger than a threshold. If these conditions are satisfied, the customer-state determining unit 1002 determines that the customer is highly likely to be in search of a commodity.

In the case of the shoplifting state and the case of the ill health state, the customer-state determining unit 1002 determines whether a marked customer condition is satisfied. More specifically, in the case of the shoplifting state, the customer-state determining unit 1002 determines, based on the face image of the monitoring information in the monitoring information table 108, whether visual lines of the customer are directed to various parts of a passage. The customer-state determining unit 1002 determines, based on the position information of the monitoring information in the monitoring information table 108, whether the customer is moving around in a predetermined region. The customer-state determining unit 1002 determines, based on the commodity registration information in the monitoring information table 108, whether the number of registered commodities is smaller than the threshold. If these conditions are satisfied, the customer-state determining unit 1002 determines that the customer is highly likely to be a shoplifter.

In the case of the ill health, the customer-state determining unit 1002 determines, based on the face image of the monitoring information in the monitoring information table 108, whether the customer looks pale. The customer-state determining unit 1002 determines, based on the position information of the monitoring information in the monitoring information table 108, whether the customer has not moved within a predetermined period. The customer-state determining unit 1002 determines, based on the commodity registration information in the monitoring information table 108, whether the number of registered commodities is smaller than the threshold. If these conditions are satisfied, the customer-state determining unit 1002 determines that the customer is possibly ill.

The report managing unit 1003 is an example of a reporting unit. The report managing unit 1003 reports if the customer-state determining unit 1002 determines that the customer is in a specific state. For example, the report managing unit 1003 manages the guidance process in the customer terminal 20. More specifically, if the customer-state determining unit 1002 determines that the customer is searching for a commodity, the report managing unit 1003 reports, to the customer, the presence or absence of the commodity in stock that the customer is searching for. In other words, if the customer-state determining unit 1002 determines that the customer is highly likely to be searching for a commodity, the report managing unit 1003 extracts, from the monitoring information table 108, a commodity terminal code associated with the monitoring information set as a determination target. The report managing unit 1003 causes the communication control unit 1001 to transmit a guidance confirmation request to the customer terminal 20 indicated by the extracted commodity terminal code. Consequently, the report managing unit 1003 reports, to the customer, via the customer terminal 20, presence or absence of the commodity that the customer is searching for.

As a response to the guidance confirmation request, if the commodity that the customer is searching for is present, the communication control unit 1001 receives commodity information indicating the commodity that the customer is searching for. In this case, the report managing unit 1003 reports to the customer who is searching for a commodity a position where the commodity is located, based on the information of commodity master 109 that stores positions where particular commodities are located. If receiving the commodity information as the response to the guidance confirmation request, the report managing unit 1003 extracts, from the commodity master 109, commodity position information of the specified commodity. The report managing unit 1003 causes the communication control unit 1001 to transmit the extracted commodity position information to the customer terminal 20. Consequently, the report managing unit 1003 reports, via the customer terminal 20, to the customer who is searching for a commodity.

If the customer-state determining unit 1002 determines that the customer is highly likely to be a shoplifter or the like, the report managing unit 1003 transmits the face image of the customer and position information for the customer to a predetermined store clerk terminal 30. More specifically, if the customer-state determining unit 1002 determines that the customer is highly likely to be a shoplifter or the like, the report managing unit 1003 extracts the latest position information and the latest face image for the customer in the monitoring information. The report managing unit 1003 causes the communication control unit 1001 to transmit shoplifting report information, including the extracted position information and the extracted face image, to the store clerk terminal 30. Consequently, the report managing unit 1003 reports via the store clerk terminal 30 that a suspicious person is present.

If the customer-state determining unit 1002 determines the customer to be a suspicious person, the report managing unit 1003 transmits the face image of the customer and the position information to a predetermined terminal. If the customer-state determining unit 1002 determines that the customer is highly likely to be ill, the report managing unit 1003 extracts the latest position information and the latest face image for the customer in the monitoring information. The report managing unit 1003 causes the communication control unit 1001 to transmit ill health report information including the extracted position information and the extracted face image to the store clerk terminal 30. Consequently, the report managing unit 1003 reports, via the store clerk terminal 30, that a customer is highly likely to be ill.

The control unit 301 of the store clerk terminal 30 loads, in the RAM, the control program 307 stored in the storing unit 302 and operates according to the control program 307 to generate functional units in the RAM. Specifically, the control unit 301 of the store clerk terminal 30 includes a communication control unit 3001 and a report control unit 3002 as the functional units.

The communication control unit 3001 controls the communication interface 303 to execute communication with the management server 10.

The report control unit 3002 reports if the communication control unit 3001 receives the shoplifting report information or the ill health report information. More specifically, if the communication control unit 3001 receives the shoplifting report information, the report control unit 3002 reports, based on the shoplifting report information, that a customer highly likely to be a shoplifter is present. For example, the report control unit 3002 reports by displaying on the touch panel display 304 that the customer present in the position indicated by the position information included in the shoplifting report information and having the face image is highly likely to be a suspicious person who commits shoplifting.

If the communication control unit 3001 receives the ill health report information, the report control unit 3002 reports, based on the ill health report information, that a customer highly likely to be ill is present. For example, the report control unit 3002 reports by displaying on the touch panel display 304 that the customer present in the position indicated by the position information included in the ill health report information and having the face image is highly likely to be ill.

Figure 9:
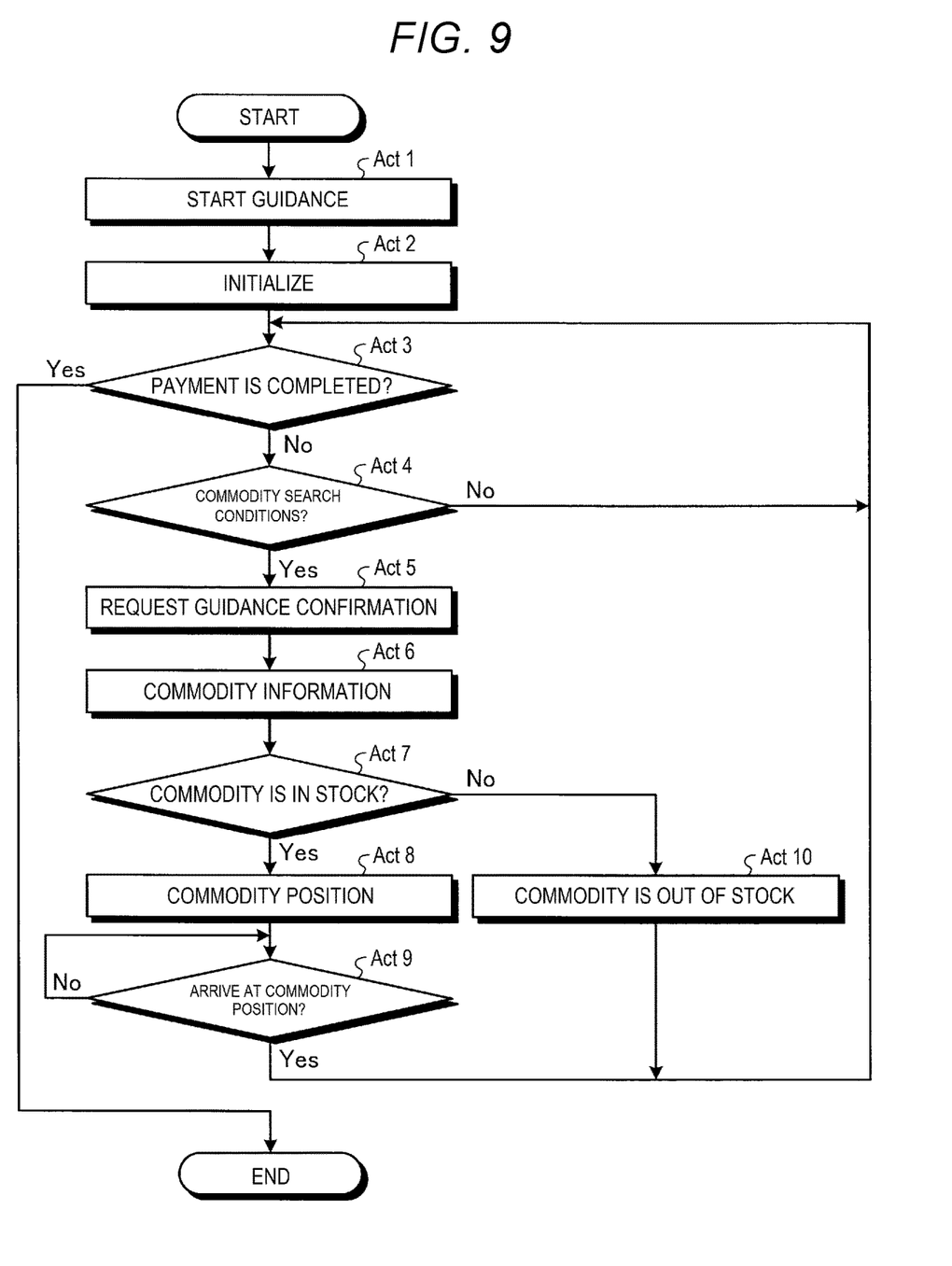
FIG. 9 is a flowchart illustrating an example of a guidance process executed by a management server according to an embodiment.

FIG. 9 is a flowchart illustrating an example of the guidance process executed by the management server 10 in this embodiment.

The report managing unit 1003 detects a trigger (e.g., a triggering event or the satisfaction of a triggering condition) for starting the guidance process (Act 1). For example, when the customer terminal 20 is attached to the cart POS 21, the report managing unit 1003 detects the movement of the cart POS 21 as a trigger. If the customer terminal 20 is brought in from the exterior of the store, the report managing unit 1003 identifies the detection of the entrance of the customer terminal 20 into the store as a trigger.

The report managing unit 1003 executes an initialization process (Act 2). For example, the report managing unit 1003 requests the customer terminal 20 to periodically transmit monitoring information. Consequently, the customer terminal 20 periodically transmits the monitoring information to the management server 10. Accordingly, the customer-state determining unit 1002 can accumulate monitoring information in the monitoring information table 108.

The communication control unit 1001 determines whether payment completion information indicating the completion of a payment process has been received (Act 3). If the payment completion information is not received (No in Act 3), the report managing unit 1003 determines, based on the information in the monitoring information table 108 and the reference information table 110, whether "commodity search" state conditions are satisfied (Act 4). In other words, the report managing unit 1003 determines whether the customer appears to be searching for a commodity. If the customer is not searching for a commodity (No in Act 4), the management server 10 returns to Act 3.

If the customer is searching for a commodity (Yes in Act 4), the report managing unit 1003 causes the communication control unit 1001 to transmit a guidance confirmation request (Act 5). At this time, the report managing unit 1003 causes the communication control unit 1001 to transmit the guidance confirmation request to the customer terminal 20 corresponding to the customer terminal code in the monitoring information table 108 found to be satisfying the "commodity search" state conditions.

The communication control unit 1001 then receives a response to the guidance confirmation request. The response may include commodity information indicating a particular commodity that the customer is searching for (Act 6).

The report managing unit 1003 determines whether the particular commodity indicated in the received commodity information is in stock (Act 7). If the commodity is in stock (Yes in Act 7), the report managing unit 1003 informs the customer of a position of the commodity (Act 8). In other words, the report managing unit 1003 extracts, from the commodity master 109 in this example, commodity position information for the commodity for which the customer is presently searching. The report managing unit 1003 causes the communication control unit 1001 to transmit the extracted commodity position information.

The report managing unit 1003 determines, based the position information for the customer terminal 20, whether the customer terminal 20 has arrived at the position of the commodity (Act 9). If the customer terminal 20 has not yet arrived at the position of the commodity (No in Act 9), the report managing unit 1003 continues guiding the customer to the position where the commodity is located.

If the customer terminal 20 arrives at the position of the commodity (Yes in Act 9), the report managing unit 1003 ends the position guidance process. The management server 10 returns to Act 3.

If the commodity is out of stock in Act 7 (No in Act 7), the report managing unit 1003 reports that the designated commodity is out of stock (Act 10). In other words, the report managing unit 1003 causes the communication control unit 1001 to transmit information to the customer terminal 20 indicating that the commodity is out of stock. The management server 10 returns to Act 3.

If payment completion information (information indicating the completion of the payment process) is received in Act 3 (Yes in Act 3), the management server 10 ends the guidance process.

Figure 10:
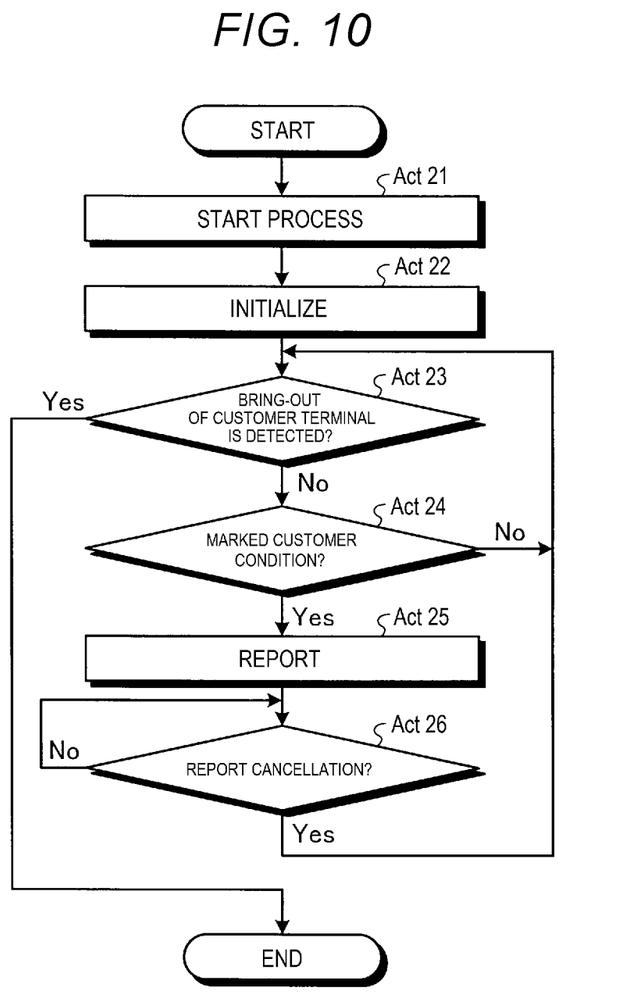
FIG. 10 is a flowchart illustrating an example of a notification process executed by a management server according to an embodiment.

FIG. 10 is a flowchart indicating an example of the notification process executed by the management server 10 in an embodiment.

The report managing unit 1003 detects a trigger for starting the notification process (Act 21). For example, if the customer terminal 20 is attached to the cart POS 21, the report managing unit 1003 detects movement of the cart POS 21 as a trigger. If the customer terminal 20 is brought in from outside of the store, the report managing unit 1003 considers the detection of the entrance of customer terminal 20 into the store to be a trigger.

The report managing unit 1003 executes an initialization process (Act 22). For example, the report managing unit 1003 requests the customer terminal 20 to periodically transmit monitoring information. Consequently, the customer terminal 20 periodically transmits the monitoring information to the management server 10. Accordingly, the customer-state determining unit 1002 can accumulate monitoring information in the monitoring information table 108.

The report managing unit 1003 determines whether the customer terminal 20 has been removed or is being removed from the store (Act 23). Removal of the customer terminal 20 may be referred to in some contexts as a "bring-out" of the customer terminal 20. For example, if determining (based on the position information) that the customer terminal 20 is beyond an exit of the store or if not receiving any position information for a customer terminal 20 within a predetermined period, the report managing unit 1003 determines that the customer terminal 20 has been removed from the store.

If not detecting that the customer terminal 20 has been removed from the store (No in Act 23), the report managing unit 1003 determines whether the marked customer condition, which is a determination standard for determining whether the customer is likely to be shoplifter or the like or highly likely to be ill, is satisfied (Act 24).

If the marked customer condition is not satisfied (No in Act 24), the report managing unit 1003 returns to Act 23. If the marked customer condition is satisfied (Yes in Act 24), the report managing unit 1003 reports according to the marked customer condition (Act 25). In other words, the report managing unit 1003 transmits the latest face image for such a customer along with the latest position information in the monitoring information table 108 to the store clerk terminal 30. Consequently, the store clerk can identify whether any customer is presently satisfying a marked customer condition.

The communication control unit 1001 determines whether report cancellation is received from the store clerk terminal 30 (Act 26). In other words, the communication control unit 1001 determines whether a notification to the effect that an appropriate measure has been taken with respect to a previously marked customer has been received.

If the report cancellation is not received (No in Act 26), the management server 10 continues a report state in Act 26. If the report cancellation is received (Yes in Act 26), the report managing unit 1003 cancels the report state and returns to Act 23.

If detecting that the customer terminal 20 is brought out from the store (Yes in Act 23), the management server 10 ends the notification process.

As explained above, the management server 10 according to this embodiment receives, from the customer terminal 20, information obtained by monitoring the customer, such as a face image of the customer, position information indicating where the customer is located, and state information indicating a commodity registration state of the customer. The management server 10 collates the received various kinds of information with the reference information table 110 including information for collation to determine a state of the customer. The management server 10 reports according to the state of the customer. For example, in the case in which the customer is searching for a commodity, the management server 10 inquires about the search via the customer terminal 20. Consequently, the store clerk does not need to perform customer attendance. If determining that the customer is highly likely to be a shoplifter or determining that the customer is highly likely to be ill, the management server 10 reports to the store clerk terminal 30. Consequently, the store clerk can monitor the state of the customer before actual attendance is required. Accordingly, the management server 10 according to this embodiment can reduce a burden on the store clerk in customer attendance.

While several embodiments are explained above, these embodiments are presented as examples and are not intended to limit the scope of the present disclosure. Various modifications are possible and contemplated.

In the example explained above, suspected shoplifter is used as an example of a suspicious person. However, suspicious persons are not limited to potential shoplifters and may be a person considered likely to commit another act whether criminal or merely disruptive. In such a case as well, the management server 10 determines that a customer committing, or considered likely to commit, the relevant act as a suspicious person. When determining the customer is the suspicious person, the management server 10 reports by transmitting, to the store clerk terminal 30, a face image of the customer and position information indicating a where the customer is located.

In the example explained above, the management server 10 is considered an information processing device according to an embodiment. However, in other embodiment the customer terminal 20 or the store clerk terminal 30 may themselves include all or some of the functions described for the management server 10 in the example embodiment. In other words, the customer terminal 20 or the store clerk terminal 30 may include the communication control unit 1001, the customer-state determining unit 1002, and the report managing unit 1003. Alternatively, in other examples, the management server 10, the customer terminal 20, and the store clerk terminal 30 may cooperate to realize these functions.

The programs executed by the devices in the embodiments and the modifications thereto can be incorporated in advance in storage media (e.g., ROMs or other non-volatile storage units) included in the various devices, but the present disclosure is not limited to this. For example, the relevant programs may be recorded in a non-transitory, computer-readable recording medium such as a CD-ROM, a flexible disk (FD), a CD-R, or a DVD (Digital Versatile Disc) as an installable format or executable format file. Furthermore, the program(s) may be stored in a networked storage medium and downloaded via a network connection or the like.

The program(s) may be provided or distributed across a network such as the Internet.

While certain embodiments have been described, these embodiments have been presented by way of example only, and are not intended to limit the scope of the present disclosure. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device for a retail store, the device comprising:
   a communication interface configured to receive a face image of a customer of a store, position information for the customer indicating a position of the customer in the store, and item registration information indicating items registered by the customer using a customer terminal; and
   a processor configured to:
      compare the face image received via the communication interface to a face image pattern for potential customer states,
      compare the position information received via the communication interface to a movement pattern for the potential customer states,
      compare the item registration information received via the communication interface to pre-established item registration values for the potential customer states,
      determine, based on the comparisons, whether a present state of the customer is one of the potential customer states, and
      generate a report if the present state of the customer is determined to be one of the potential customer states, wherein
   the potential customer states include a commodity searching state, a suspicious state, and an ill state, and
      the report includes information regarding the presence or absence of a specific commodity when the present state of the customer is determined to be the commodity searching state.

2. The information processing device according to claim 1, wherein, if the present state of the customer is determined to be the commodity searching state, the generated report is sent to the customer terminal and causes a request for the customer to identify the specific commodity for which the customer is searching to be displayed on a display screen of the customer terminal.

3. The information processing device according to claim 2, wherein the report includes information indicating a position of the specific commodity in the store if the specific commodity is in stock.

4. The information processing device according to claim 1, wherein, if the present state of the customer is determined to be the suspicious state, the generated report includes a position of the customer in the store and is sent to a clerk terminal along with the face image of the customer.

5. The information processing device according to claim 1, wherein, if the present state of the customer is determined to be the ill state, the generated report includes a position of the customer in the store and is sent to a clerk terminal along with the face image of the customer.

6. The information processing device according to claim 1, further comprising:
   a storage unit including a commodity master table with an entry for each item for sale at the store.

7. The information processing device according to claim 1, further comprising:
   a storage unit storing:
      face image patterns for each of the potential customer states,
      movement patterns for each of the potential customer states, and
      pre-established item registration values for each of the potential customer states.

8. The information processing device according to claim 7, wherein the storage unit additionally stores a commodity master table with an entry for each item for sale at the store.

9. A customer monitoring system, comprising:
   a customer terminal including:
      a first communication interface;
      an imaging unit configured to acquire a face image of a customer operating the customer terminal;
      a short range wireless communication interface configured to receive beacon signals; and
      a first processor configured to:
         generate registered item information based on items registered by the customer using the customer terminal,
         generate position information based on the beacon signals received by the short range wireless communication interface, and
         transmit the face image, the position information, and the registered item information via the first communication interface,
   a server including:
      a second communication interface configured to receive the face image, the position information, and the registered item information from the customer terminal; and
      a second processor configured to:
         compare the face image to a face image pattern for potential customer states,
         compare the position information to a movement pattern for the potential customer states,
         compare the registered item information to pre-established item registration values for the potential customer states,
         determine, based on the comparisons, whether a present state of the customer is one of the potential customer states, and
         generate a report if the present state of the customer is determined to be one of the potential customer states, wherein
      the potential customer states include a commodity searching state, a suspicious state, and an ill state, and
      the report includes information regarding the presence or absence of a specific commodity when the present state of the customer is determined to be the commodity searching state.

10. The customer monitoring system according to claim 9, wherein, if the present state of the customer is determined to be the commodity searching state, the generated report is sent to the customer terminal and causes a request for the customer to identify the specific commodity for which the customer is searching to be displayed on a display screen of the customer terminal.

11. The customer monitoring system according to claim 10, wherein the report is sent to the customer terminal and includes information indicating a position of the specific commodity in the store if the specific commodity is in stock.

12. The customer monitoring system according to claim 9, wherein, if the present state of the customer is determined to be the suspicious state, the generated report includes a position of the customer in the store and is sent to a clerk terminal along with the face image of the customer.

13. The customer monitoring system according to claim 9, wherein, if the present state of the customer is determined to be the ill state, the generated report includes a position of the customer in the store and is sent to a clerk terminal along with the face image of the customer.

14. The customer monitoring system according to claim 11, wherein the server further includes a storage unit storing:
    face image patterns for each of the potential customer states,
    movement patterns for each of the potential customer states, and
    pre-established item registration values for each of the potential customer states.

15. A method of monitoring customers in a retail location, the method comprising:
    receiving inputs of a face image of a customer, position information indicating a position of the customer in a retail location, and item registration information indicating items registered by the customer using a mobile customer terminal;
    comparing the received face image to a face image pattern for potential customer states;
    comparing the received position information to a movement pattern for the potential customer states; and
    comparing the received item registration information to pre-established item registration values for the potential customer states;
    determining, based on the comparisons, whether a present state of the customer is one of the potential customer states; and
    generating a report if the present state of the customer is determined to be one of the potential customer states, wherein
    the potential customer states include a commodity searching state, a suspicious state, and an ill state, and
    the report includes information regarding the presence or absence of a specific commodity when the present state of the customer is determined to be the commodity searching state.

16. The method according to claim 15, wherein, if the present state of the customer is determined to be the commodity searching state, the generated report includes a request for the customer to identify the specific commodity for which the customer is searching.

17. The method according to claim 15, wherein, if the present state of the customer is determined to be either the suspicious state or the ill state, the generated report includes a position of the customer in the store and is sent to a clerk terminal along with the face image of the customer.

* * * * *